United States Patent
Wong et al.

(10) Patent No.: US 8,000,478 B2
(45) Date of Patent: Aug. 16, 2011

(54) KEY HANDSHAKING METHOD AND SYSTEM FOR WIRELESS LOCAL AREA NETWORKS

(75) Inventors: Marcus Wong, Green Brook, NJ (US); Sergey Bezzateev, St. Petersburg (RU)

(73) Assignee: Samsung Electronics Co., Ltd. (KR)

( * ) Notice: Subject to any disclaimer, the term of this patent is extended or adjusted under 35 U.S.C. 154(b) by 1103 days.

(21) Appl. No.: 11/438,284

(22) Filed: May 23, 2006

(65) Prior Publication Data
US 2007/0192600 A1  Aug. 16, 2007

Related U.S. Application Data

(60) Provisional application No. 60/684,989, filed on May 27, 2005.

(30) Foreign Application Priority Data

Feb. 15, 2006  (KR) ......................... 10-2006-0014701

(51) Int. Cl.
*H04L 9/08* (2006.01)
*H04L 9/32* (2006.01)

(52) U.S. Cl. ......... 380/283; 713/168; 713/171; 713/176

(58) Field of Classification Search .................. 713/168, 713/171, 176; 380/283
See application file for complete search history.

(56) References Cited

U.S. PATENT DOCUMENTS

| | | | | |
|---|---|---|---|---|
| 5,729,608 | A * | 3/1998 | Janson et al. | 713/171 |
| 7,350,077 | B2 * | 3/2008 | Meier et al. | 713/171 |
| 2004/0240412 | A1 * | 12/2004 | Winget | 370/331 |
| 2005/0254653 | A1 * | 11/2005 | Potashnik et al. | 380/270 |
| 2006/0083200 | A1 * | 4/2006 | Emeott et al. | 370/331 |
| 2006/0107050 | A1 * | 5/2006 | Shih | 713/171 |
| 2007/0189249 | A1 * | 8/2007 | Gurevich et al. | 370/338 |
| 2008/0016350 | A1 * | 1/2008 | Braskich et al. | 713/169 |
| 2008/0065884 | A1 * | 3/2008 | Emeott et al. | 713/168 |
| 2008/0069105 | A1 * | 3/2008 | Costa et al. | 370/392 |

OTHER PUBLICATIONS

"Alternative Pair-wise Key Exchange Protocols for Robust Security Networks (IEEE 802.11i) in Wireless LANs", Altunbasak, H.; Owen, H.; SoutheastCon, 2004. Proceedings. IEEE, Mar. 26-29, 2004 pp. 77-83.

IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements, IEEE Std 802.11i-2004.

"Wireless LAN security and IEEE 802.11i", Jyh-Cheng Chen; Ming-Chia Jiang; Yi-Wen Liu;, Wireless Communications, IEEE, vol. 12, Issues 1, Feb. 2005 pp. 27-36.

* cited by examiner

*Primary Examiner* — Michael Pyzocha
(74) *Attorney, Agent, or Firm* — NSIP Law

(57) ABSTRACT

A key handshake method in a wireless local area network (LAN) capable of performing authentication between two wirelessly connected stations by exchanging keys once is provided. Because the security key for authentication can be exchanged by one 4-way handshake between an authenticator and a supplicant in a wireless LAN, an authentication delay can be prevented.

9 Claims, 1 Drawing Sheet

KEY HANDSHAKING METHOD AND SYSTEM FOR WIRELESS LOCAL AREA NETWORKS

CROSS-REFERENCE TO RELATED APPLICATIONS

This application claims the benefit of U.S. Provisional Application No. 60/684,989, filed May 27, 2005, in the United States Patent and Trademark Office, and claims the benefit under 35 U.S.C. §119(a) of Korean Patent Application No. 2006-14701, filed Feb. 15, 2006, in the Korean Intellectual Property Office, the entire disclosures of which are hereby incorporated by reference.

BACKGROUND OF THE INVENTION

1. Field of the Invention

The present invention relates to a key handshake method in a wireless local area network (LAN). More particularly, the present invention relates to a key handshake in a wireless LAN which is capable of performing an authentication process with one key handshake between two wirelessly connected stations.

2. Description of the Prior Art

An ad-hoc mode or an infrastructure mode is generally used for a Media Access Control (MAC) layer according to IEEE 802.11. In the ad-hoc mode, more than two mobile stations (STA) recognize each other and establish peer-to-peer communications without using existent infrastructure. However, the infrastructure mode has an Access Point (AP) for data broadcast among all the connected mobile stations. The AP and the mobile stations form a basic service set (BSS) which communicates on an unlicensed radio frequency (RF) spectrum.

In the BSS mode, a 4-way handshake is used, which means several key exchanges are necessary for the authentication. Therefore, the authentication process is lengthened, and a method for reducing authentication time between a supplicant and an authenticator is required.

Accordingly, there is a need for an improved key handshake method in a wireless local area network (LAN) capable of performing an authentication process with one key exchange between wirelessly connected stations.

SUMMARY OF THE INVENTION

An aspect of exemplary embodiments of the present invention is to address at least the above problems and/or disadvantages and to provide at least the advantages described below. Accordingly, exemplary embodiments of the present invention have been made to address the above-mentioned issues that occur in the prior art. Also, an aspect of an exemplary embodiment of the present invention is to provide a key handshake method in a wireless local area network (LAN) capable of performing an authentication process with one key exchange between the two wirelessly connected stations.

According to an exemplary embodiment of the present invention, a key handshake method is provided in a wireless local area network (LAN) for authentication between wirelessly connected stations. A first nonce is generated at a first station, the first nonce is transmitted from the first station to a second station, a second nonce is received from the second station to the first station, a pair-wise transient key (PTK) is generated based on the second nonce, and the PTK is installed in the first station.

The step of generating the PTK may comprise the step of also generating a group transient key (GTK).

The step of transmitting the nonce may comprise the step of encrypting the GTK and transmitting the encrypted GTK together with the nonce.

The step of exchanging a message integrity code (MIC) message between the first and the second stations may also be provided.

The step of exchanging the MIC message may comprise the step of encrypting the GTK and transmitting the encrypted GTK together with the MIC message.

The step of installing the PTK may also comprise the step of installing the GTK.

BRIEF DESCRIPTION OF THE DRAWINGS

The above and other exemplary objects, features, and advantages of certain exemplary embodiments of the present invention will be more apparent from the following description taken in conjunction with the accompanying drawing, in which.

DESCRIPTION OF THE EXEMPLARY EMBODIMENT

Figure 1:
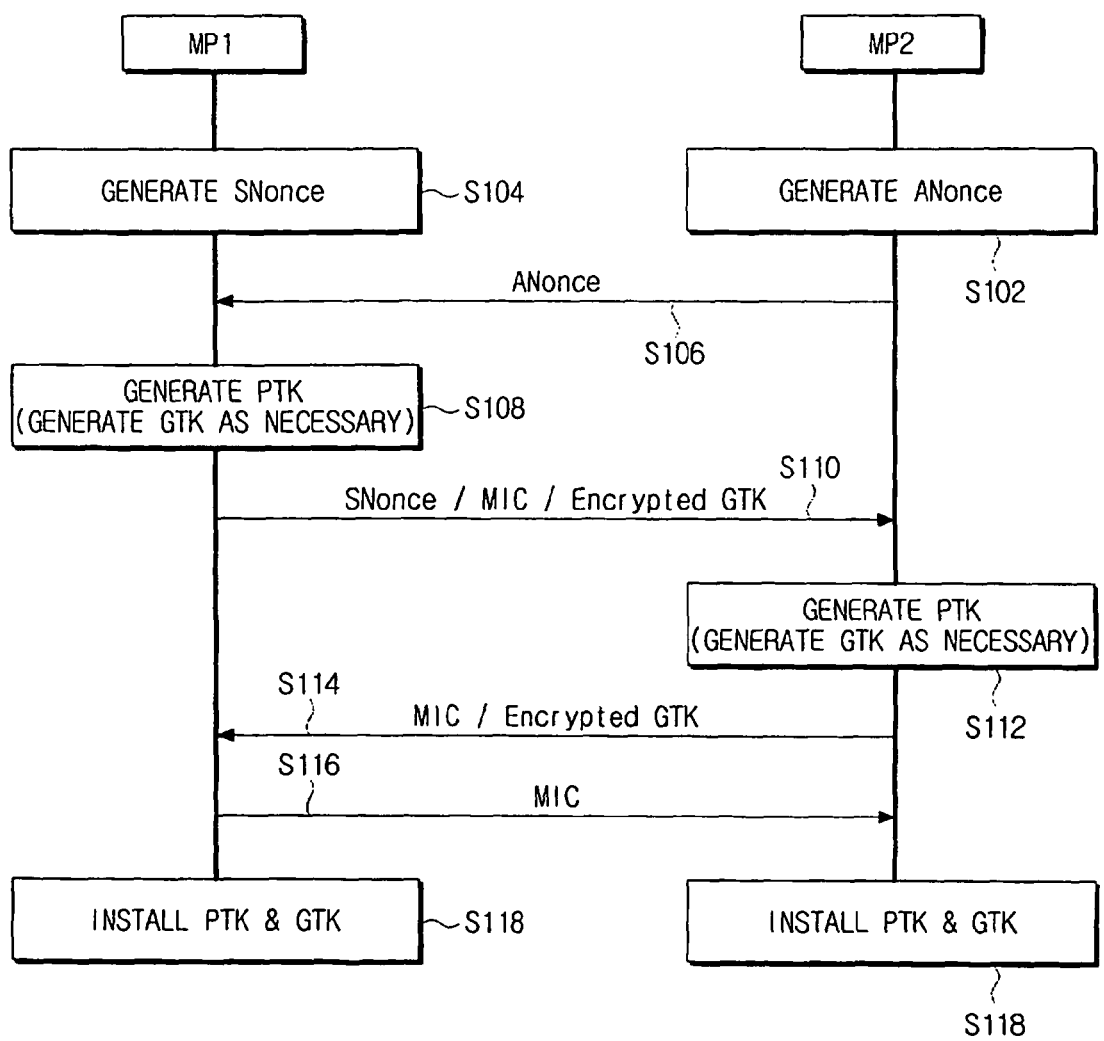
FIG. 1 is a flowchart provided to explain a key handshake method in a wireless LAN according to an exemplary embodiment of the present invention.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A security key of an exemplary embodiment of the present invention will be briefly explained below.

A security key includes a master key (MK), a pair-wise master key (PMK), and a pair-wise transient key (PTK). The PMK is generated from the MK in the AAA (Authentication, Authorization and Accounting) server, which is the upper server forming a distribution system (DS), and transmitted to the station (STA) via the corresponding AP. The PTK is generated from PMK at the AP and the STA. The MK is used for the security of the AAA server and for the security between the STA and the AP. The PTK is used as a key confirmation key (KCK), a key encryption key (KEK), and a temporary key (TK). The KCK uses 0~127 bits of the PTK, and the KEK uses 128~255 bits of the PTK. The TK uses the rest of the bits.

In an attempt to solve the problem of weak security in an IEEE 802.11 wireless LAN system, IEEE 802.11i provides IEEE 802.1X/1aa-based access control, security session management, dynamic key handshake, and key management. An application of new symmetric key cipher suites for wireless area data protection is also provided. In other words, the IEEE 802.1X/1aa standard defines the frame of user authentication and key handshake. In this regard, IEEE 802.11i standard defines that IEEE 801.1X/1aa can be used as the frame of user authentication and key handshake. Additionally, IEEE 802.11i includes definitions of the 4-way handshake as a detailed handshake method, key hierarchy use structure of exchanged keys, and new wireless area cipher suites.

The key handshake method in a wireless LAN, according to one exemplary embodiment of the present invention, will be explained below with reference to the flowchart of FIG. 1.

With reference to FIG. 1, two stations are wirelessly connected to each other in a wireless LAN. For example, a supplicant mobile station phone as the first mesh point (MP1) and an authenticator station as the second mesh point (MP2) exchange keys for authentication.

The MP1 and the MP2 generate a session key in the upper protocols based on IEEE 802.1X, and compute the MK using the session keys. The Robust Security Network Association (RSNA) security structure generates the MK into a security key suitable for media access control (MAC) and transmits it to a MAC S/W (Software) management unit (not shown).

The MAC H/W management unit (not shown) uses the upper protocols according to RSNA authentication structure defined by an IEEE 802.11 task group (TG), and a security key generated by the MAC S/W management unit in security suites to perform encryption or decryption.

The MP1 and the MP2 include an extensible authentication protocol (EAP) function block, a port access entity (PAE) processing block, an EAPOL function block and an EAPOL-key frame processing block. The EAP function block supports EAP operation based on IEEE 802.1X authentication proposal. The EAPOL function block receives preset data of 802.1X authenticator from the PAE processing block, and according to the received preset data, generates the EAPOL packet which is prescribed by the IEEE 802.1X standard. The EAPOL function block analyzes the externally-received EAPOL packet and transmits the analysis to the PAE processing block.

In the MP2 unit, the PAE processing block performs authenticator port access entity (PAE) as defined by the RSNA authentication structure. While in the MP1 unit, the PAE processing block performs a supplicant PAE.

The MP1 and the MP2 include a 4-way handshake (HS) controller. The 4-way HS controller controls key information management, frame transmission, and reception for key generation proposed by IEEE 802.11 TGi. The 4-way HS controller also receives through user interface, the RSNA authentication structure data of the authenticator or the supplicant station. According to the 4-way key handshake process, the 4-way HS controller transmits management information so that the EAPOL-Key frame processing block can generate an EAPOL-Key based on the received RSNA authentication information. Additionally, the 4-way HS controller stores and maintains the EAPOL-Key frame information received from the EAPOL-Key frame processing block.

The EAPOL-Key frame processing block analyses the received EAPOL-Key frame information. When the EAPOL-Key frame is the frame exchanged in the 4-way HS process, the EAPOL-Key frame processing block transmits the analyzed RSNA authentication information to the 4-way HS controller.

The MP1 and the MP2 receive an EAP-success packet from the AP, analyze the received packet, and determine whether IEEE 802.1X authentication is successfully completed according to the analyzed result. The MP1 and the MP2 generate the session key which is generated in the IEEE 802.1X authentication process, and sets the generated session key as primary master key (PMK).

The MP2 which is in possession of the PMK, generates an authenticator nonce (ANonce) through the EAPOL-key frame processing block (S102).

Similarly, the MP1 which is in possession of the PMK, generates a supplicant nonce (SNonce) through the EAPOL-key frame processing block (S104).

The MP2 transmits the ANonce to the MP1 through the 4-way HS controller (S106).

The MP1 generates a pair-wise transient key (PTK) based on the SNonce and the ANonce through the EAPOL-key frame processing block (S108). The MP1 contains the group key HS controller, and generates a group transient key (GTK) as necessary.

The MP1 then transmits the SNonce and an encrypted GTK to the MP2 through the 4-way HS controller (S110).

Meanwhile, the MP2 generates the PTK based on the received SNonce and its ANonce (S112). The MP2 may generate the GTK as necessary.

The MP2 encrypts the GTK, and transmits the encrypted GTK and message integrity code (MIC) message to the MP1 through the 4-way HS controller (S114).

Accordingly, the MP1 transmits the MIC (MICAHAL) message to MP2 through the MAC H/W management unit (S116).

When the PTK and the GTK are received from the distant station, the MP1 and the MP2 install the received PTK and GTK in their devices, respectively (S118).

Therefore, the MP1 and the MP2 can exchange the security key for authentication with one 4-way handshake.

As described above in the exemplary embodiments of the present invention, the security key for authentication can be exchanged once by the one 4-way handshake between an authenticator and a supplicant in a wireless LAN. Accordingly, delay of authentication between the authenticator station and the supplicant station can be prevented in wireless LAN.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A key handshake method in a wireless local area network (LAN) for authentication between wirelessly connected stations, the key handshake method, in a single handshake, comprising:
   generating a first nonce at a first station;
   transmitting the first nonce from the first station to a second station;
   receiving a second nonce from the second station to the first station, and generating a pair-wise transient key (PTK) based on the second nonce; and
   installing the PTK in the first station;
   wherein the receiving of the second nonce comprises receiving an encrypted group transient key (GTK) from the second station.

2. The key handshake method of claim 1, further comprising generating the group transient key (GTK) after the receiving of the second nonce from the second station to the first station.

3. The key handshake method of claim 2, further comprising exchanging a message integrity code (MIC) message between the first and the second stations.

4. The key handshake method of claim 3, wherein the exchanging of the MIC message comprises encrypting the GTK and transmitting the encrypted GTK together with the MIC message.

5. The key handshake method of claim 2, further comprising installing the GTK in the first station.

6. A wirelessly connected system comprising:
   a first mesh point for generating a pair-wise transient key (PTK) based on a supplicant nonce (SNonce) and based on an authenticator nonce (ANonce) and transmitting the SNonce in a single handshake; and a second mesh point for generating a pair-wise transient key (PTK) based on a received SNonce and based on an ANonce;

wherein the first mesh point further comprises a group key hand shake controller and is configured to generate and encrypt a group transient key (GTK), and transmit the GTK in the single handshake;

wherein the first mesh point transmits the SNonce and the encrypted group transient key (GTK) to the second mesh point.

7. The system as claimed in claim 6, wherein the first mesh point receives the PTK and a group transient key (GTK) from the second mesh point.

8. The system as claimed in claim 6, wherein the second mesh point installs the PTK in the first mesh point.

9. A first wireless station configured to communicate with a second wireless station, the first wireless station comprising:

a 4-way handshake controller;

wherein a first nonce is transmitted through the 4-way handshake controller from the first wireless station to the second wireless station in a single handshake, a second nonce is received from the second wireless station through the 4-way handshake controller of the first station in the single handshake, and the first wireless station generates a pair-wise transient key (PTK) based on the received second nonce;

wherein an encrypted group transient key (GTK) is received through the 4-way handshake controller with the second nonce from the second wireless station in the single handshake.

* * * * *